United States Patent [19]

Drake

[11] 3,834,741
[45] Sept. 10, 1974

[54] EXPANSION JOINT

[76] Inventor: Frederick E. Drake, c/o Elastofab Company, Inc., Oak Ridge Road R. D. No. 3, Oak Ridge, N.J. 07438

[22] Filed: Apr. 26, 1973

[21] Appl. No.: 354,691

[52] U.S. Cl. ............................................. 285/226
[51] Int. Cl. .............................................. F16l 21/00
[58] Field of Search ........... 285/301, 226, 227, 228, 285/45, 47

[56] References Cited
UNITED STATES PATENTS

| | | | |
|---|---|---|---|
| 2,616,728 | 11/1952 | Pitt | 285/47 |
| 2,886,066 | 5/1959 | Hansen | 285/226 |
| 2,894,535 | 7/1959 | Hansen | 285/226 |
| 2,920,656 | 1/1960 | Bertolet | 285/226 |

*Primary Examiner*—Patrick D. Lawson

[57] ABSTRACT

An expansion joint for two pipes wherein one of said pipes can move relative to the other of said pipes. Said expansion joint includes a flexible sleeve having a first end, a second end and a corrugated portion there between. Clamping means secures said first end of said flexible sleeve to one pipe and additionally clamping means secures said second end of said flexible sleeve to the other pipe. Annular floating rings are provided with each ring surrounding a groove between two ridges in the corrugated portion of said flexible sleeve.

7 Claims, 4 Drawing Figures

PATENTED SEP 10 1974

EXPANSION JOINT

BACKGROUND OF THE INVENTION

1. Field of the Invention

Expandable joint for connecting a first pipe to a second pipe.

2. Description of the Prior Art

In many different situations a fluid is transferred from a first pipe to a second pipe with the pipes being spaced apart from each other along a common axis for the pipes and wherein one of said pipes moves along said axis relative to the other of said pipes.

The prior art utilized bellows for connecting the two pipes to each other. Quite obviously, the bellows allowed relative movement between the pipes while providing fluid communication therebetween. However, the use of a bellows per se to fluidly connect two pipes wherein one of the pipes moved relative to the other had certain drawbacks in that unless reinforcing means was provided about the bellows, the bellows "snaked" i.e. assumed a sinusoidal shape. This was undesirable since with increasing amounts of snaking the bellows had a tendency to snap open.

The prior art attempted to solve this problem by reinforcing certain portions of the bellows to prevent the same from snaking. While the prior art was generally successful in preventing the bellows from snaking, portions thereof would greatly expand as a result of the pressure of the fluid therein. This was undesirable as it created stress concentrations in the bellows limiting the useful life thereof. Clearly, the most desirable situaton occurs when there is no snaking of the bellows and the expansion of any portion thereof is limited with the bellows enabling one of the pipes to be moved toward or away from the other of the pipes.

SUMMARY OF THE INVENTION

PURPOSES OF THE INVENTION

It is an object of the present invention to provide an improved means for connecting a first pipe to a second pipe wherein said first pipe can move relative to said second pipe.

Another object of the present invention is to provide improved means for connecting a first pipe to a second pipe wherein said first pipe can move relative to said second pipe with said means being effective for its intended purpose and having a long operating life.

Yet another object of the present invention is to provide means for connecting a first pipe to a second pipe wherein one of said pipes can move relative to the other of said pipes with said means being capable of economic construction.

Other objects of the invention will in part be obvious and in part be pointed out hereinafter.

BRIEF DESCRIPTION OF THE INVENTION

According to one embodiment of the present invention, the foregoing and other objects are achieved by providing a flexible sleeve having two ends. The flexible sleeve is corrugated intermediate its two ends. One of said ends is secured to one end of a first pipe and the other of said ends is secured to one end of a second pipe with said pipe ends being spaced from each other and said pipes are co-axial. The first pipe can move towards and away from the second pipe and vice versa. Spacer rings surround the flexible sleeve and are in contact with the grooves in the corrugated portion thereof.

If one of the pipes is moved towards the other pipe, the ridges of the corrugated portion of the flexible sleeve expand outwardly, the distance between adjacent grooves decreases and the spacer rings move towards each other. When one of the pipes is moved away from the other pipe the radial dimension of the ridges of the corrugated portion of the flexible sleeve decreases and the distance between adjacent spacer rings increases. The flexible sleeve is extended along its length to accommodate the increase in distance between the two pipes.

A further embodiment of the invention is set forth hereinafter in detail.

DESCRIPTION OF THE PREFERRED EMBODIMENTS

Figure 1:
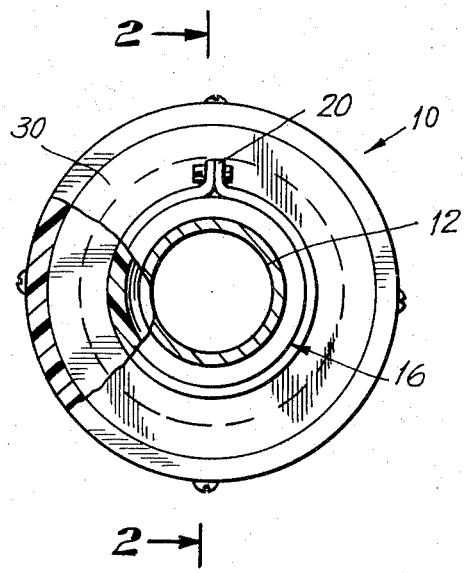
FIG. 1 is an end plan view, partially broken, of a first embodiment of the present invention.
Figure 2:
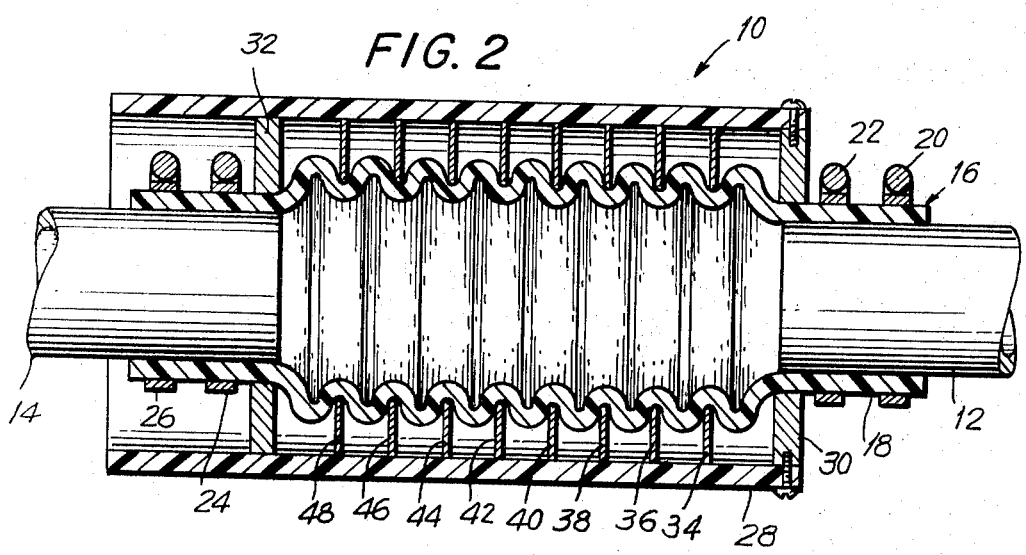
FIG. 2 is a sectional view taken substantially along the line 2—2 of FIG. 1.

In FIGS. 1 and 2 of the drawings an embodiment 10 of the present invention is shown and includes a first pipe 12 and a second pipe 14. Pipes 12 and 14 can be of conventional construction and in normal use the pipe ends are spaced apart from each other with the pipes co-axial. However, the distance that said pipes are spaced apart from each other can vary. A flexible sleeve 16 is provided and includes a first end 18. Two clamps 20 and 22 clamp first end 18 of flexible sleeve 16 to the end of pipe 12 shown in FIG. 2. In a similar fashion, clamps 24 and 26 clamp the remaining end of flexible sleeve 16 to the end of pipe 14 shown in FIG. 2. Clamps 20, 22, 24 and 26 can be of conventional design and different constructions therefore will be apparent to those having ordinary skill in the art. The portion of flexible sleeve 16 intermediate pipes 12 and 14 is corrugated.

A rigid plastic guard tube 28 is provided and includes a rigid ring 30 at the right end thereof. Means is provided for securing rigid ring 30 to flexible sleeve 16 so that there is no relative movement between said rigid ring and said flexible sleeve. Said means can be conventional and will be apparent to those having ordinary skill in the art. A floating ring 32 surrounds flexible sleeve 16 and is adjacent clamp 24. Ring 32 can move relative to rigid guard tube 28. Located within rigid guard tube 28 and surrounding flexible sleeve 16 are a plurality of identical floating spacer rings 34, 36, 38, 40, 42, 44, 46 and 48. Each spacer ring is annular in configuration and the inner periphery of each ring is located in a groove between two of the adjacent ridges in the corrugated portion of flexible sleeve 16. The outer periphery of each spacer ring is in light contact with the inside surface of rigid guard tube 28 and can move relative thereto.

When pipe 12 is moved away from pipe 14, the elognated linear dimension of flexible sleeve 16 is increased. As a result thereof, each ridge in the corrugated portion of sleeve 16 decreases in radial dimension and the distance between adjacent grooves in the corrugated portion of sleeve 16 is increased. Each spacer ring moves with the groove it surrounds so that the distance between adjacent spacer rings increases. Ring 32 stays to the left of the leftmost ridge in the corrugated portion of sleeve 16. The spacer rings prevent outward expansion and ballooning of the flexible sleeve as fluid is passed between pipes 12 and 14. In addition, the spacer rings prevent snaking of the flexible sleeve which, as noted before, is undesirable.

If pipe 12 is moved towards pipe 14, the elongated linear dimension of flexible sleeve 16 is decreased. As a consequence thereof, the distance between adjacent grooves in the corrugated portion of the flexible sleeve decreases. As each spacer ring moves with the groove it surrounds the distance between adjacent spacer rings decreases.

Further, the radial dimension of each ridge of the corrugated portion of flexible sleeve 16 increases. As before, ballooning and snaking is prevented.

Figure 3:
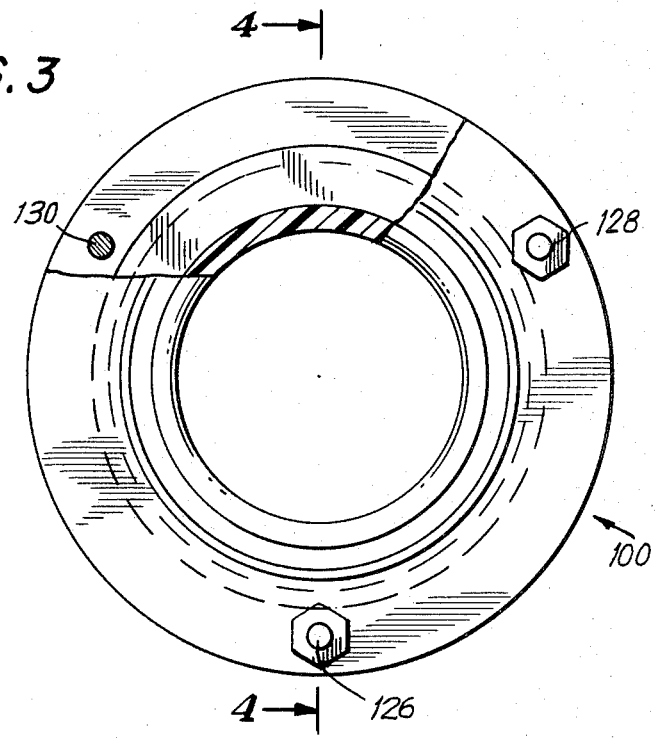
FIG. 3 is an end plan view, partially broken, of a second embodiment of the present invention.
Figure 4:
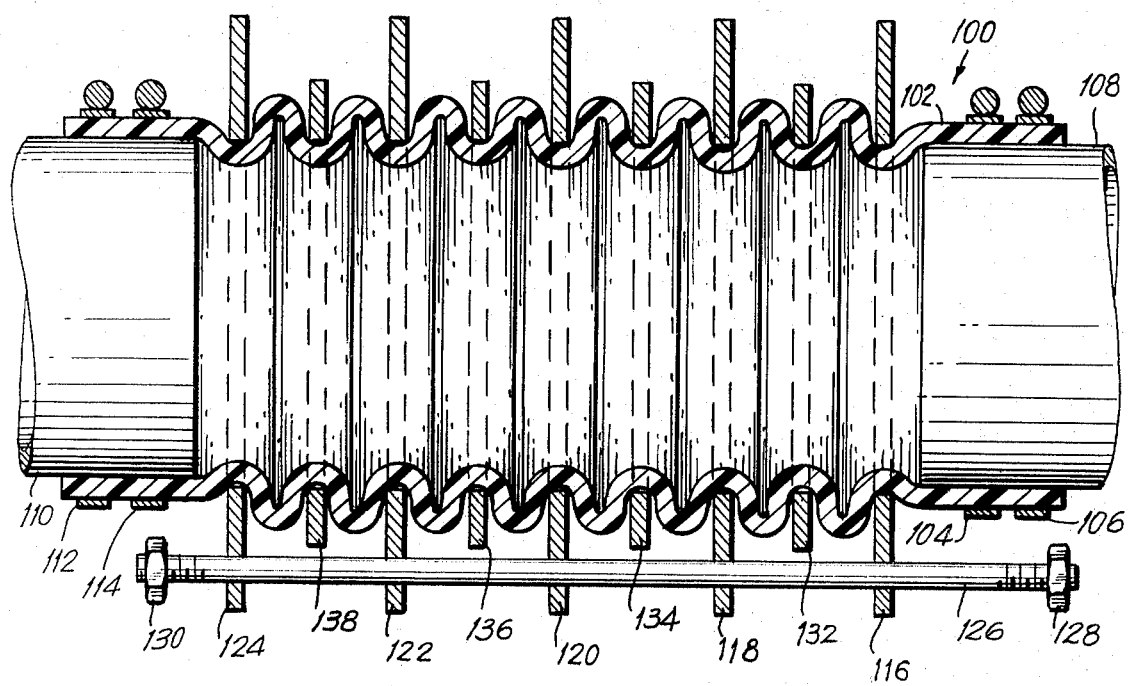
FIG. 4 is a sectional view taken substantially along the line 4—4 of FIG. 3.

In FIGS. 3 and 4 of the drawings, a further embodiment 100 of the present invention is shown. Embodiment 100 includes a flexible sleeve 102 which has its right end clamped by clamps 104 and 106 to pipe 108. In a similar fashion, the left end of flexible sleeve 102 is clamped to pipe 110 by clamps 112 and 114. Flexible sleeve 102 is corrugated intermediate its two ends. The ends of pipes 108 and 110 are spaced apart from each other with the pipes being co-axial. A plurality of spacer rings 116, 118, 120, 122 and 124 are provided and are identical in configuration. Each of spacer rings 116 through 124 is annular and includes three bolt clearance holes. Three bolts are provided and are identified by reference numerals 126, 128 and 130. Bolt 126 passes through one set of registered bolt clearance holes in spacer rings 116, 118, 120, 122 and 124. Nuts 128 and 130 are threaded with the threaded opposed ends of bolt 126 and flank spacer rings 116, 118, 120, 122 and 124. In a similar fashion, bolt 128 is passed through registered bolt clearance holes of spacer rings 116, 118, 120, 122 and 124 and secured at its opposed ends by nuts. Bolt 130, similarly passes through the remaining registered bolt clearance holes of each of spacer rings 116, 118, 120, 122 and 124. Nuts are placed in threaded engagement with the ends of bolt 130 as heretofore described in connection with bolt 126. Each of the spacer rings is positioned so that it surrounds a groove flanked by two ridges in the corrugated portion of the flexible sleeve and each spacer ring is separated from an adjacent spacer ring by the distance between two grooves.

A small diameter annular spacer ring which does not contain any bolt clearance holes is located between each of the aforedescribed spacer rings which contain bolt clearance holes. More specficially, small diamter spacer ring 132 is located between spacer rings 116 and 118, small diameter spacer ring 134 is located between spacer rings 118 and 120, small diameter spacer ring 136 is located between spacer rings 120 and 122 and small diamter spacer ring 138 is located between spacer rings 122 and 124. Each of the small diameter spacer rings is within an imaginary cylinder which passes through each of bolts 126, 128 and 130.

The inner periphery of each small diameter spacer ring is positioned about a groove between two adjacent ridges of the corrugated portion of said flexible sleeve and between two spacer rings having bolt clearance holes. The spacer rings prevent ballooning and snaking.

If pipe 108 is moved towards pipe 110, the elongated dimension of flexible sleeve 102 is decreased and the distance between adjacent grooves in the corrugated portion thereof decreases. Similarly, the radial dimension of each ridge increases. Each spacer ring remains about the groove it surrounds and moves therewith. Accordingly, the distance between adjacent spacer rings decreases. Spacer rings 116, 118, 120, 122 and 124 can move relative to bolts 126, 128 and 130 so as to be able to float.

If pipe 110 is moved away from pipe 108, then the elongated dimension of flexible sleeve 102 increases. Accordingly, the distance between adjacent grooves in the corrugated portion of the flexible sleeve increases and the radial distance between each ridge in the corrugated portion and the elongated central axis of the flexible sleeve decreases. The spacer rings float and each ring is positioned closer to its adjacent rings than in the previous condition.

The construction of the flexible sleeve is conventional. The inner diameter of each spacer ring of FIG. 4 is the same.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the present invention there is claimed as new and desired to be secured by letters Patent:

1. Flow apparatus comprising a first pipe having a first end, a second pipe having a first end, said first end of said second pipe being spaced from said first end of said first pipe, a flexible sleeve having a first end and a second end and an elongated central axis, means connecting said first end of said flexible sleeve to said first end of said first pipe, means connecting said second end of said flexible sleeve to said first end of said second pipe, said flexible sleeve including a corrugated portion intermediate said first and second ends thereof, said corrugated portion including alternating ridges and grooves, a plurality of annular movable means, each annular movable means in contact with a groove, each movable means being movable axially and independently from the other movable means and means for controlling the position of certain of said movable means whereby when said first pipe is moved towards said second pipe the distance between said grooves of said flexible sleeve decreases and each movable means is positioned closer to its adjacent movable means and when said first pipe is moved away from said second pipe the distance between each groove of said corrugated portion of said flexible sleeve increases and the distance between each movable means and its adjacent movable means increases.

2. Apparatus according to claim 1 wherein said plurality of movable means includes a plurality of annular spacer rings, and said controlling means including means for guiding the movement of at least some of said spacer rings.

3. Apparatus according to claim 2 wherein said means for guiding the movement of some of said spacer rings includes having at least one hole extend through certain of said spacer rings, a member passing through a hole of each spacer ring having a hole and means located at the opposite ends of said member for preventing said member from being pulled through any of said holes said member passes through.

4. Apparatus according to claim 3 wherein those spacer rings not having a hole extending therethrough have a smaller outer diameter than the distance between the elongated central axis of said flexible sleeve and said member.

5. Apparatus according to claim 4 wherein said spacer rings not having a hole alternate along the length of the corrugated portions of said flexible sleeve with said spacer rings having a hole.

6. Apparatus according to claim 2 wherein said means for guiding the movement of some of said spacer rings includes a rigid guard tube, the outer periphery of each of said spacer rings being surrounded thereby.

7. Apparatus according to claim 6 wherein said rigid guard tube includes a first end and a second end, a rigid ring surrounded by said rigid guard tube and secured to said first end of said rigid guard tube and prevented from moving relative to said first end of said flexible sleeve, a movable ring surrounded by said rigid guard tube and located adjacent the second end of said rigid guard tube and surrounding the portion of said flexible sleeve located between said means clamping said second end of said flexible sleeve and said corrugated portion of said flexible sleeve.

* * * * *